July 21, 1970 E. D'AGATA 3,520,983
DEVICE FOR COMPOSING AND PLAYING MUSICAL MOTIFS
Filed Dec. 19, 1966 2 Sheets-Sheet 1

July 21, 1970   E. D'AGATA   3,520,983
DEVICE FOR COMPOSING AND PLAYING MUSICAL MOTIFS
Filed Dec. 19, 1966   2 Sheets-Sheet 2

United States Patent Office 3,520,983
Patented July 21, 1970

3,520,983
DEVICE FOR COMPOSING AND PLAYING MUSICAL MOTIFS
Eliana D'Agata, 497 Via Flaminia Vecchia, Rome, Italy
Filed Dec. 19, 1966, Ser. No. 602,817
Claims priority, application Italy, Jan. 8, 1966, 406/66
Int. Cl. G10f 1/00; G10h 3/04
U.S. Cl. 84—1.03
9 Claims

ABSTRACT OF THE DISCLOSURE

A panel is provided with terminals to which can be applied notes with which are associated electrical components which are connected by a sequencing switch to an oscillator to control the frequency of the latter.

---

The present invention relates to a device for composing and playing musical motifs.

It is well known that by electric and electronical means it is possible to produce sounds and to embody musical instruments generating the various frequencies corresponding to the musical notes.

The purpose of the present invention is that of providing a musical instrument allowing a musical piece to be composed note by note and to be played, by the material association of physical elements, each of which represents one note and by note generating means so as to obtain the composed motif to be played.

The device thereby embodied allows the musical motif to be listened after the musical page has been composed by the aforesaid physical elements each of which represents one note. The embodiment will be interesting as an educational toy, or in a more sophisticated embodiment, as a study and training instrument.

According to the present invention, the device for composing and playing the musical motifts includes a carrier panel with a set of staff shaped lines, along which it is possible to apply removable insertion members showing a note mark and containing an electric element which determines the oscillation frequency of an electronic oscillator, means for sequentially switching said electric elements for their connection to the electronic oscillator in order to thereby obtaining a variation of the oscillation frequency according to the sequence of musical notes as established by the aforesaid insertion members.

The sequential switching can be obtained by scanning means of mechanical type, or by electro-mechanical means with a motor operated switch, or also by matrix switching electronic means driven by scanning circuits controlled by an astable multivibrator.

The note generator, consisting of an electronic oscillator can have its frequency determined by an electric component such as a resistor, a capacitor or an inductance, said electric element being incorporated within the insertion members and having a value selected for each note so as to determine the right value of the oscillation frequency according to that particular musical note which is represented by the insertion member.

The present invention will be now described with reference to certain embodiments thereof at present preferred, disclosed by way of nonlimitative example, and with reference to the attached drawings, wherein.

Figure 1:
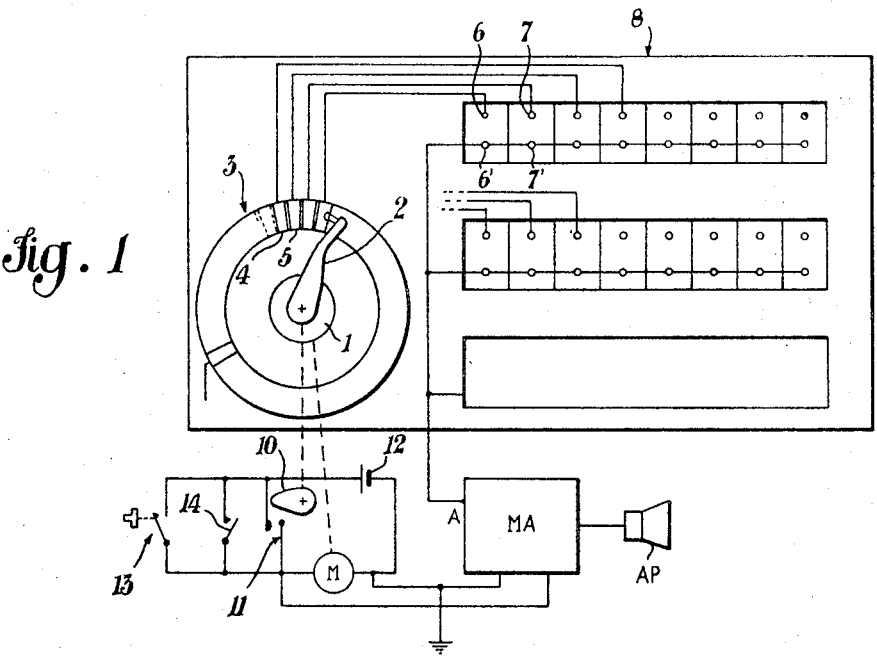
FIG. 1 shows the principle diagram of a first embodiment of the device according to this invention.
Figure 2:
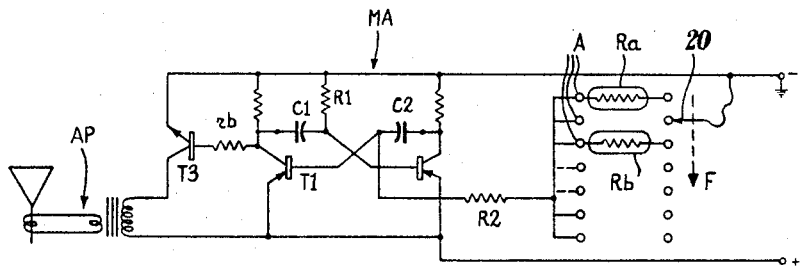
FIG. 2 shows the electric diagram of a possible note oscillator according to this invention.
Figure 3:
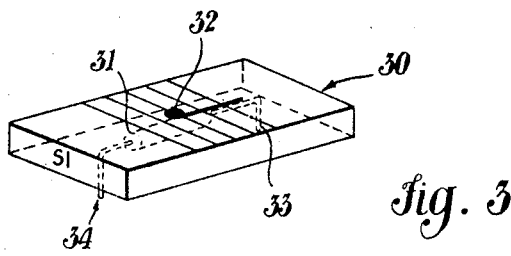
FIG. 3 shows one embodiment of a note insertion member including an electric component for determining the oscillation frequency of the note oscillator.

The device essentially consists of three parts and particularly: a scanning device; a note generator and a musical page.

The device will be now described with reference to a first embodiment at present preferred, monophonic, i.e. allowing a single note to be obtained by time by mechanical scanning and with an electronic note generator with a variable frequency depending upon the value of a resistor.

The scanning device can be embodied by electric, electromechanical, electronic, photoelectric means and the like, either linear or circular attaining the purpose of having a sequential closure of a set of contacts. The scanning device can also have more panels in order to obtain sounds with more notes (chords) and the scanning speed can be fixed if the case may be, or it can be changed at a given moment of the musical motif with suitable switching means in order to obtain different rhythms (lento, allegro, etc.).

It is also clear that the note generator (or the note generators) can be of different types, for instance blocked oscillator type, astable multivibrator type, tuned circuit with phase change, etc., and the control element for the frequency associated to each note can be one of the elements which determine the oscillation frequency (resistance, capacity or inductance). In other cases the note can be obtained by the insertion of a bridge which connects one of the elements determining the frequency. In any case, any one of these systems must reach the purpose of generating a frequency in register with each note associated to one scanning step.

It is also clear that the musical page can be embodied in various manners as far as the size, the number of steps, the number of the lines, the contact system of the note are concerned, provided that the essential purpose will be reached of ensuring that the various notes will be sequentially scanned through the time in order to generate the musical motif. These pages can be interchangeable so as to be capable of keeping a given composite musical motif. Some musical pages can already be entirely or partially composed.

A first embodiment will be now described with reference to the FIGS. 1 to 4 of the attached drawings.

The scanning device includes an electric motor M provided with a speed reducer 1 on the shaft of which a brush 2 is mounted, said brush having a gliding contact. The contact array 3 consists of a printed circuit including in a particular embodiment 64 sectors which are shown by 4, 5 etc., which are sequentially scanned by the brush 2.

Each sector 4, 5 etc., is connected individually to one of the terminals of the positions of the notes 6, 7 etc. of the musical page 8, in a logical reading sequence, while the other terminal associated to each note 6', 7' is common with all the other analogous terminals and brought to the terminal A of the oscillator MA.

The brush 2 is connected to ground through the body of the motor M. The connections from the sectors to the single notes of the musical page can be embodied either by electrical conductors, or preferably by a single printed circuit.

A cam 10 operates at the end of each playing performance a microswitch 11 which stops playing the musical motif by deenergizing the motor through the breaking of one of the wires connecting it to the battery 12. A starting switch 13 short-circuits the microswitch 11 through a time sufficient to disengage it from the cam.

A lever switch 14 in parallel with the key and with the microswitch allows the repeated listening of the motif.

The note generator consists of an astable multivibrator MA (FIGS. 1 and 2) wherein one branch of a circuit has a fixed time constant (R1C1) while the time constant of the other branch is variable $$[(R2+Ra)C2, (R2-Rb)C2]$$

and changing depending upon the value of the resistors $Ra$, $Rb$, etc., inserted between the ground and the connection terminal A. The ground connection is obtained by the gliding contact 20 which moves in the direction of the arrow F.

The collector of the transistor T1 is connected through a resistor $rb$ to the base of the transistor T3 which is provided on its collector circuit with a loudspeaker AP. The values of the frequency in correspondence with each resistance placed between the terminal A and the ground carried by the brush 20 depend also upon the values of the capacitors C1, C2 which can be switched in order to have sounds in a higher or lower octave.

Figure 4:
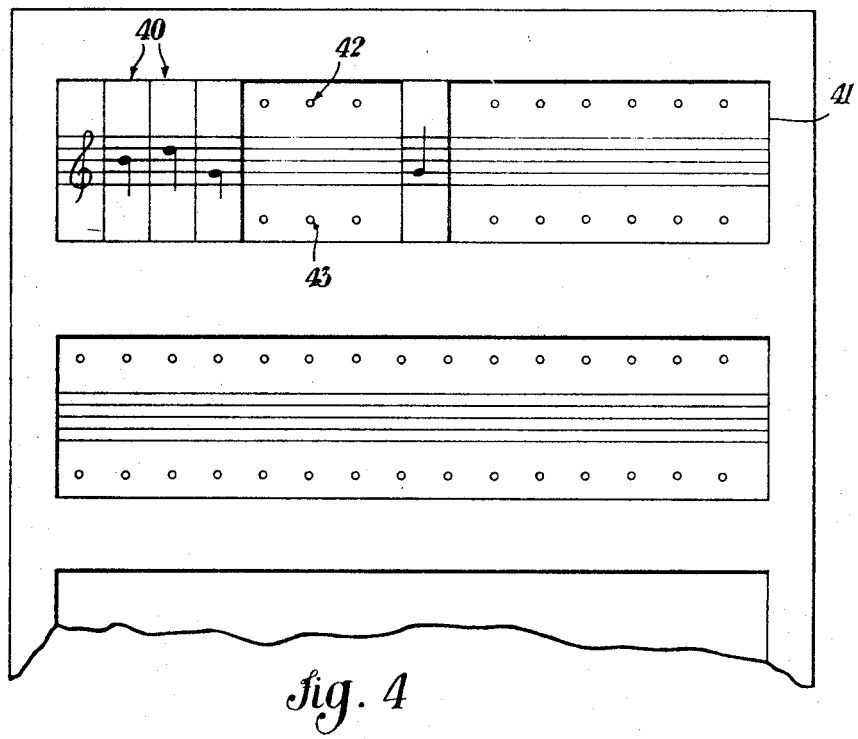
FIG. 4 shows an embodiment of the composition page of the musical motif to be composed and played by the device according to this invention.

The musical page, as shown in FIG. 4, includes a certain number of cases 40 located on lines 41.

Each case is provided with two contacts 42, 43 one of which is connected to a sector of the scanning board 3, while the other common to all cases, is connected to the terminal A of the note generator.

Each note consists of an insertion member 30 made of plastic within which is embedded a resistor 31 having a value corresponding to the frequency of the note 32 shown on the insert. The two terminals 33, 34 of the resistor contact, when the resistor has been inserted, the terminals 42, 43 placed in the case of the musical page.

Each insert 30 is provided on its upper surface, with a staff graph so that the musical composition embodied on the musical page will allow a musically readable score.

It is possible also to use inserts occupying two or more steps in order to generate long notes and also fictitious insertion members for introducing pauses between the notes.

Figure 5:
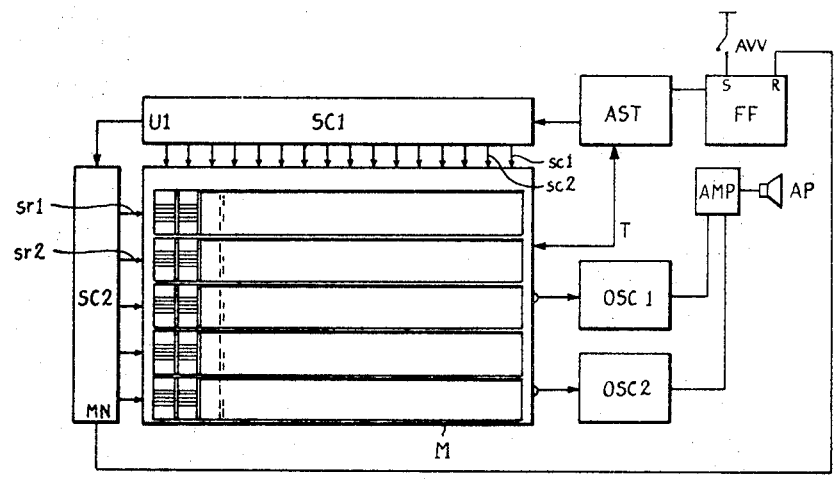
FIG. 5 shows a second embodiment of the device according to this invention.

With reference to FIG. 5, a device of the related kind will be described, with entirely electronic scanning means.

The device includes an astable oscillator AST which determines the transition times from one note to the subsequent note, which drives a first scanning generator SC1 which enables conductors $sc1$, $sc2$ corresponding to columns of the matrix M whereon the musical motif is embodied. After the scanning of one line of the matrix M one output from the scanning generator SC1 causes the scanning generator SC2 to advance through one step, switching the enabling from the line $sr1$ to line $sr2$ and sequentially for all lines until reaching the final position MN wherefrom a block control of the oscillator is extracted through a flip flop FF which had been set true by a starting key AVV. From each crossing of the conductors of the matrix M, controls T can be derived for determining the duration of the step and therefore of the note and the controls for determining the frequency of oscillation of one or two oscillators shown by OSC1 or OSC2 driving an amplifier AMP which drives a loudspeaker AP.

The particular structure of these electronic circuits is well known to any electronic technician skilled in the techniques of the pulses, and accordingly a detailed specification is deemed unnecessary.

Various changes and modifications can be provided in the proposed embodiments for the musical motif composing and playing device; for instance the motor could be a mechanical motor, or a simple manually loaded spring in order to have a rectilinear movement, it would be possible to include circuits for changing through the time the wave form of the ocsillators or of the envelope of the oscillations in order to obtain particular musical effects.

The present invention has been described with reference to one embodiment thereof, at present preferred, but it will be understood that changes or modifications might be provided without departing from the scope of the present industrial privilege.

What is claimed is:

1. A device for composing and playing musical motifs, comprising an electronic oscillator, a carrier panel having a set of staff-shaped lines, insertion members each having thereon the indication of a note and including an electric element adapted for determining the oscillation frequency of said electronic oscillator, said insertion members being detachably insertable in said panel for connection to said oscillator, and scanning means for sequentially connecting said electric element to the electronic oscillator in order to obtain a change of the frequency of oscillation according to the sequence of musical notes provided by the aforesaid insertion members.

2. A device as claimed in claim 1 wherein the scanning means includes a motor and a switch coupled to said motor and having as many positions as there are note positions on the panel.

3. A device as claimed in claim 2, said scanning means including a printed circuit panel including said switch and connections of the same on the panel.

4. A device as claimed in claim 2 wherein said panel includes musical composition pages associated with said switch.

5. A device as claimed in claim 1 wherein said electronic oscillator consists of an oscillator wherein the frequency of oscillation is determined by the value of one of the electric parameters of the circuit, said value being determined by the electric elements of the insertion members whereon the representation of the musical note corresponding to the particular frequency of oscillation is marked.

6. A device as claimed in claim 5 wherein each said element is a resistor.

7. A device as claimed in claim 5 wherein each said element is a capacitor.

8. A device as claimed in claim 5 wherein each said element is an inductance.

9. A device for composing and playing musical motifs, comprising an electronic oscillator, a carrier panel having a staff-shaped set of lines and including terminals disposed along said lines, insertion members adapted to be inserted in said terminals and each carrying the indication of a note and including an electrical element adapted for determining the frequency of oscillation of said electronic oscillator, a first scanning electronic circuit, means for determining the time of playing of each note coupled to said circuit, said carrier panel including a matrix, a second scanning electronic circuit coupled to the first electronic scanning circuit and thereby to the said matrix to obtain a sequential scanning line by line of the matrix.

References Cited

UNITED STATES PATENTS

| | | | |
|---|---|---|---|
| 1,376,288 | 4/1921 | Miller | 84—1.03 |
| 2,044,223 | 6/1936 | Nuttall | 84—1.03 |
| 2,734,100 | 2/1956 | Kendall | 84—1.03 |
| 3,015,979 | 1/1962 | Davis | 84—1.03 X |
| 3,420,940 | 1/1969 | Glass et al. | 84—1.03 |

HERMAN K. SAALBACH, Primary Examiner

S. CHATMON, Jr., Assistant Examiner

U.S. Cl. X.R.

84—1.28, 4.70